United States Patent
Vamaraju

(10) Patent No.: US 10,582,469 B2
(45) Date of Patent: Mar. 3, 2020

(54) NETWORK INITIATED RANGING

(71) Applicant: QUALCOMM Incorporated, San Diego, CA (US)

(72) Inventor: Santosh Vamaraju, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 15/353,291

(22) Filed: Nov. 16, 2016

(65) Prior Publication Data

US 2018/0007651 A1 Jan. 4, 2018

Related U.S. Application Data

(60) Provisional application No. 62/357,853, filed on Jul. 1, 2016.

(51) Int. Cl.
| | |
|---|---|
| *H04W 48/10* | (2009.01) |
| *H04W 84/12* | (2009.01) |
| *H04L 12/26* | (2006.01) |
| *H04W 64/00* | (2009.01) |
| *H04B 17/318* | (2015.01) |
| *H04W 8/24* | (2009.01) |

(52) U.S. Cl.
CPC .......... *H04W 64/00* (2013.01); *H04B 17/318* (2015.01); *H04L 43/0864* (2013.01); *H04L 43/16* (2013.01); *H04W 8/24* (2013.01); *H04W 48/10* (2013.01); *H04W 84/12* (2013.01)

(58) Field of Classification Search
CPC ............................. H04W 64/00; H04W 48/10
See application file for complete search history.

(56) References Cited

U.S. PATENT DOCUMENTS

| | | | |
|---|---|---|---|
| 9,220,081 B2 | 12/2015 | Prechner et al. | |
| 2006/0088020 A1* | 4/2006 | Gass | H04W 76/10 370/338 |
| 2009/0274120 A1* | 11/2009 | Chou | H04L 5/003 370/331 |
| 2011/0206006 A1* | 8/2011 | Chindapol | H04W 36/38 370/331 |
| 2014/0286324 A1 | 9/2014 | Aldana et al. | |
| 2014/0287694 A1 | 9/2014 | Kim et al. | |
| 2015/0181553 A1 | 6/2015 | Segev | |

(Continued)

FOREIGN PATENT DOCUMENTS

| | | |
|---|---|---|
| WO | 2015179028 A1 | 11/2015 |
| WO | 2016085444 A1 | 6/2016 |

OTHER PUBLICATIONS

International Search Report and Written Opinion—PCT/US2017/035489—ISA/EPO, dated Sep. 8, 2017.

*Primary Examiner* — Angel T Brockman
(74) *Attorney, Agent, or Firm* — Kilpatrick Townsend & Stockton, LLP

(57) ABSTRACT

Disclosed are techniques for performing ranging operations between an access point and an unassociated mobile device. The techniques can include receiving, at an access point, a broadcast probe request from a mobile device unassociated with the access point. In response to receiving the probe request, it can be determined that the mobile device is capable of performing ranging operations including inspecting the received broadcast probe request. The access point can send a ranging request to the mobile device.

33 Claims, 5 Drawing Sheets

(56) References Cited

U.S. PATENT DOCUMENTS

| | | |
|---|---|---|
| 2015/0264530 A1 | 9/2015 | Prechner et al. |
| 2015/0296552 A1 | 10/2015 | Huang et al. |
| 2015/0319631 A1 | 11/2015 | Aldana et al. |
| 2015/0365913 A1 | 12/2015 | Aldana |
| 2016/0164646 A1* | 6/2016 | Kwon .................. H04L 43/16 370/252 |
| 2017/0257900 A1* | 9/2017 | Qi ........................ H04W 76/14 |
| 2017/0265122 A1* | 9/2017 | Levy ..................... H04W 8/26 |

* cited by examiner

NETWORK INITIATED RANGING

CROSS-REFERENCE TO RELATED APPLICATIONS

This application claims priority to U.S. Provisional Application No. 62/357,853, filed Jul. 1, 2016, the disclosure of which is incorporated by reference herein in its entirety and for all purposes.

BACKGROUND

Ranging operations are operations that can be performed to determine a distance between a wireless access point and a mobile device, such as a cellular phone. Mobile devices can initiate ranging operations with an associated access point in order aid in determination of a location of the mobile device. An associated access point can be an access point to which the mobile device has established a commonly negotiated connection for transfer of data between the mobile device and the access point. There is need for improvement in the art of initiating networking for an unassociated mobile device with an access point.

BRIEF SUMMARY

Disclosed are techniques for performing ranging operations between unassociated device(s). The techniques can include receiving, at a station, a broadcast probe request from a mobile device unassociated with the station. The techniques can include, in response to receiving the probe request, determining whether the mobile device is capable of performing ranging operations including inspecting the received broadcast probe request. The techniques can also include, in response to determining that the mobile device is capable of performing ranging operations, sending, by the station, a ranging request to the mobile device to initiate a ranging operation.

The mobile device, being unassociated with the station, may not have an established wireless connection channel between the mobile device and the access point. The ranging request can include a fine timing measurement (FTM) request. The determining whether the mobile device is capable of performing ranging operations by inspecting the received probe request can include inspecting an extended capabilities informational element of the received probe request. The techniques can additionally include receiving a ranging request response from the mobile device. The techniques can additionally include sending a probe response to the mobile device. The techniques can also include receiving an acknowledgment from the mobile device.

The probe request and the ranging request can be compliant to a WiFi standard. The probe request and the ranging request can be IEEE 802.11 standard compliant. The probe request and the ranging request can be IEEE 802.11REVmc standard compliant. The techniques can further include determining that the broadcast probe request from the mobile device has a signal strength above a threshold. Sending the ranging request to the mobile device can be based on determining that the broadcast probe request from the mobile device has a signal strength above the threshold.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

DETAILED DESCRIPTION

Figure 1:
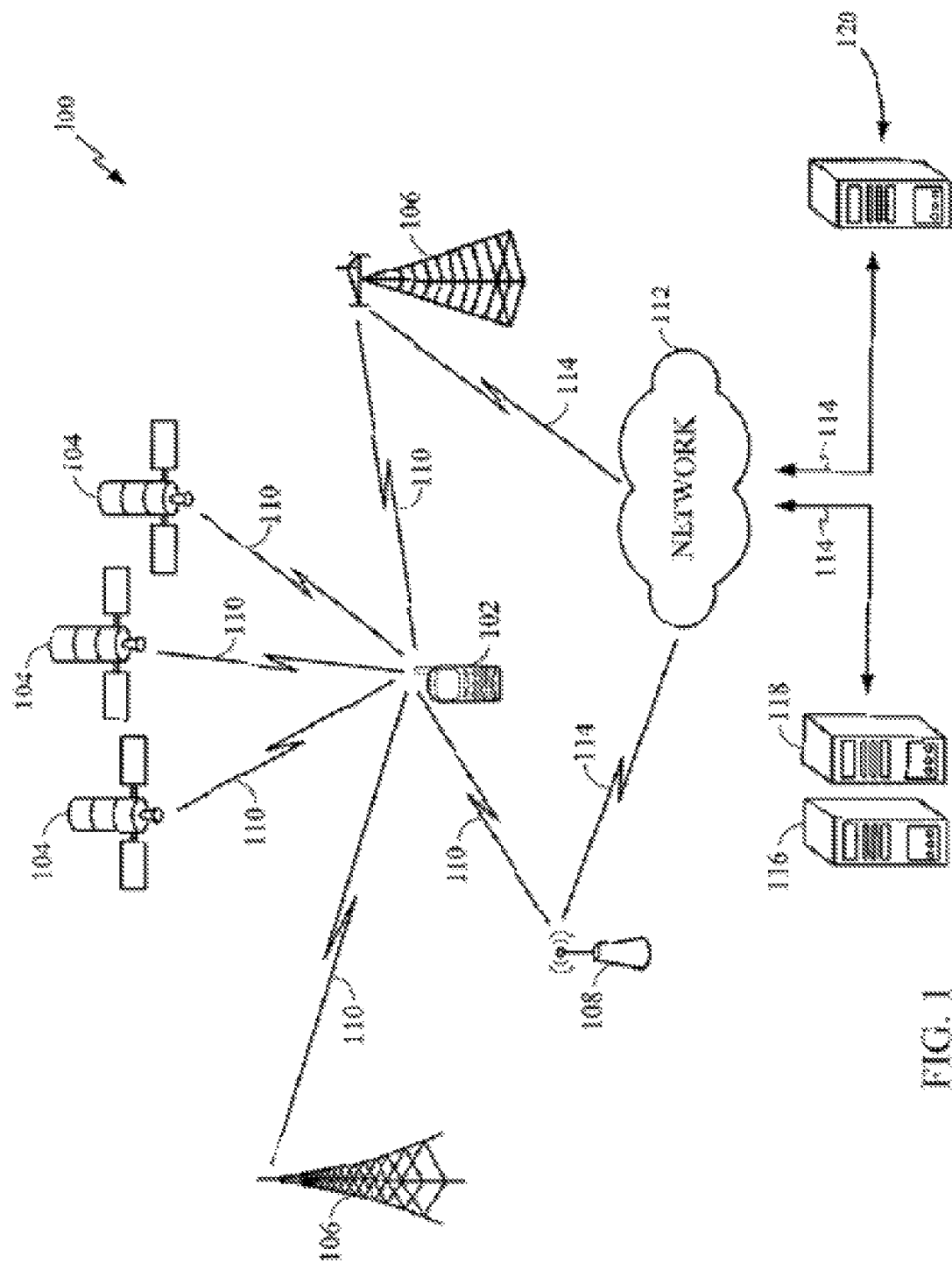
FIG. 1 is a schematic diagram illustrating features associated with an implementation of an example operating environment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Mobile devices can take advantage of location services to provide mobile device location information for various purposes. For example, a map function can select appropriate maps, direction, driving routes, etc., based on the current location of the mobile device (and/or trending location changes of the mobile device). A social networking function can identify other users within a vicinity based of the mobile device on the location of the device. Many other examples exist. Different techniques for obtaining a position fix for a mobile device may be appropriate under different conditions. Some locating techniques utilize positioning signals transmits by satellites (such as using a Global Positioning System (GPS) receiver). However, satellite or other external signals may be attenuated by building or other structures, such as when a mobile device is in inside of a building. In indoor environments (e.g., shopping mall, airport, sports arena, etc.), one method of obtaining a location fix of a mobile device can include obtaining ranging measurements using transmissions between the mobile device and one or more access points.

Ranging measurement can be initiated, for example, by a mobile device to determine a range between the mobile device and one or more access points by measuring Round Trip Times (RTTs) of transmissions between the mobile device and the one or more access points. The mobile device can derive the RTTs by, for example, measuring a time in flight of one or more transmissions between the mobile device and the one or more access points. The transmissions can include time stamps that, for example, indicate a time in which a transmission was transmitted. The time can be referenced to a common clock shared between the mobile device and the one or more access points. Furthermore, transmissions can include absolute location information of the one or more access points. Thus, by knowing the speed of transmissions (e.g., the speed of light), time of flight, and location of access points, a mobile device can trilaterate its position.

In order to perform timing measurements, a mobile device may or may not be associated with a mobile device. Association is a process wherein the mobile device and access point determine standards for communication between the mobile device and access point. For example, formats of transmissions, timings between and of transmissions, channels (e.g., frequency ranges) for communications, etc. can all be determined through the association process. Without such information, a mobile device or an access point may not be capable or received response to transmissions because, it may not be known what channel a response will be returned on, it may be unknown if the receiving entity is capable of responding, it may be unknown if the transmission was formatted in a manner that the receiving entity can receive/process, etc.

Association can be a service used to establish access point/mobile device mapping and enable mobile device invocation of distribution system services. Before a mobile device is allowed to send a MAC service data unit via an AP, it can first become associated with the AP. The MAC service data unit can be service data received from a logical link control (LLC) sub-layer that can lie above a MAC sub-layer in a protocol stack. For example, MAC service data units may not be contained in management frames (e.g., frames used to enable mobile devices to establish and maintain communications). Thus, mobile device(s) may be unable to receive service data via MAC distribution units of an LLC layer from unassociated AP(s). The act of becoming associated can invoke an association service, which provides a mobile device to AP mapping to a distribution system for invocation of distribution system services. In certain embodiments, at any given instant, a mobile device may be associated with no more than one AP. Thus association can indicate that a mobile device has established a channel for reception of data frames from a station whereas an unassociated device may receive management frames, but may not have established a channel for reception of data frames from a station. The transmission of management frames can be used to establish a connection for transmission of data frames.

An access point can typically transmit beacons periodically on one or more channels. An unassociated mobile device can discover an access point by performing passive WLAN scanning over multiple channels. If the mobile device detects a beacon, it can thus determine that an access point is in a vicinity of the mobile device. A mobile device may also perform active WLAN scanning by broadcasting probe request frames. Access points that receive the probe request frames can respond with probe response frames. Once a mobile device discovers an access point using such frames, the mobile device can then associate with the access point to determine the access point's capabilities, via association. Based on the capabilities of the access point, the mobile device may be able to initiate timing measurements with the access point.

Certain ranging operations can be initiated by an access point instead of by a mobile device. For example, a location of mobile device(s) can be used to determine traffic patterns of consumers within a store, locate passengers in an airport, generate heat maps of customers within a store or on streets of cities, or search for a missing person/device. An access point can use similar techniques as a mobile device to initiate a ranging measurement with a mobile device. An access point can similarly perform ranging measurements with an associated mobile device to ensure that the mobile device will respond to requests for performance of ranging measurements (e.g., that the format of communication is agreed, the communications are on the same channel, etc.). However, without being associated with a mobile device, an access point may not be capable of reliably initiating timing measurements for ranging operations with a mobile device because, among other complications, the access point may not be aware of the presence of a mobile device for performing ranging operations, the access point may not know channel information that the mobile device is utilizing, the access point may not be able to anticipate the availability of the mobile device to be able to initiate and successfully obtain timing measurements from the mobile device.

In certain embodiments, techniques are disclosed for performing ranging operations between an access point and an unassociated mobile device. In certain embodiments, ranging operations can be initiated by an access point that is not associated with a mobile device. A client device may be able to initiate timing measurements with access points either before, after, or without association.

FIG. 1 is a schematic diagram illustrating features associated with an implementation of an example operating environment 100 capable of facilitating or supporting one or more processes or operations for position estimation of a mobile device 102. It should be appreciated that operating environment 100 is described herein as a non-limiting example that may be implemented, in whole or in part, in the context of various communications networks or combination of networks, such as public networks (e.g., the Internet, the World Wide Web), private networks (e. g., intranets), wireless local area networks (WLAN, etc.), or the like.

It should also be noted that aspects of the disclosure may be practiced indoors or outdoors. In some example scenarios, embodiments of the invention may be operable in a Global Navigation Satellite System (GNSS)-denied (or Global Positioning System (GPS)-denied) environment. A GNSS-denied environment may refer to any environment where using GNSS satellites for obtaining a position fix for a mobile device may not be possible or may be unsatisfactory. Such GNSS-denied environments may include indoor environments, such as a shopping mall, airport, sports arena, etc., but also outdoor locations, such as urban canyons, town squares, amphitheaters, parking garages, rooftop gardens, patios, etc., where it is difficult for a mobile device to have a line of sight with sufficient GNSS satellites to obtain a position fix.

As illustrated, operating environment 100 may comprise, for example, one or more satellites 104, base transceiver stations 106, wireless signal emitting devices 108 (only one wireless signal emitting device 108 illustrated in FIG. 1 for ease of illustration, but it is understood that the operating environment 100 may include multiple signal emitting devices 108 and will generally include at least one wireless signal emitting device 108), etc., capable of communicating with mobile device 102 via wireless communication links 110 in accordance with one or more communication protocols. Satellites 104 may be associated with one or more GNSS satellite positioning systems (SPS), such as, for example, the United States Global Positioning System (GPS), the Russian Globalnaya Navigazionnaya Sputnikovaya Sistema (GLONASS) system, the European Galileo system, as well as any system that may utilize satellites from a combination of satellite systems, or any satellite system developed in the future. Although, in describing some embodiments, for simplicity and illustration purposes a GPS or GNSS-denied environment is discussed, other satellite positioning systems may be substituted without departing from the scope of the invention. Base transceiver stations 106, wireless signal emitting devices 108, mobile device 102, etc., may be of the same or similar type, for example, or may represent different types of devices, such as Access Points, radio beacons, cellular mobile stations, cellular base stations, femtocells, or the like, depending on an implementation. At times, one or more signal emitting devices, for example, may be capable of transmitting as well as receiving wireless signals. In some instantiations, wireless signal emitting devices 108, may also include devices configurable to emit signals such as Wi-Fi signal, audible and non-audible sound, and (visible and non-visible) light rays.

In some instances, one or more base transceiver stations 106, signal emitting devices 108, etc., may, for example, be operatively coupled to a network 112 that may comprise one or more wired or wireless communications or computing networks capable of providing suitable or desired information, such as via one or more communication links 114. As will be seen, information may include, for example, assistance information associating relevant places of interests (POIs) with known locations within an indoor or like area of interest and brand specific visual signatures attributed to these POIs, just to illustrate one possible implementation. At times, assistance information may include, for example, identities or locations of one or more base transceiver stations 106, wireless signal emitting devices 108, or the like to facilitate or support one or more operations or processes associated with operating environment 100. As a way of illustration, assistance information may, for example, be provided in the form of a digital map, look-up table, mathematical formula, suitable model, algorithm, etc., which may depend, at least in part, on an application, network, environment, or the like. In an implementation, network 112 may be capable of facilitating or supporting communications between suitable computing platforms or devices, such as, for example, mobile device 102, one or more base transceiver stations 106, wireless signal emitting devices 108, as well as one or more servers associated with operating environment 100.

In some instances, servers may include, for example, a crowdsourcing server 116, a heat map distribution server 118, as well as one or more other servers, indicated generally as 120 (e.g., navigation, information, map, server, etc.), capable of facilitating or supporting one or more operations or processes associated with operating environment 100.

Figure 2:
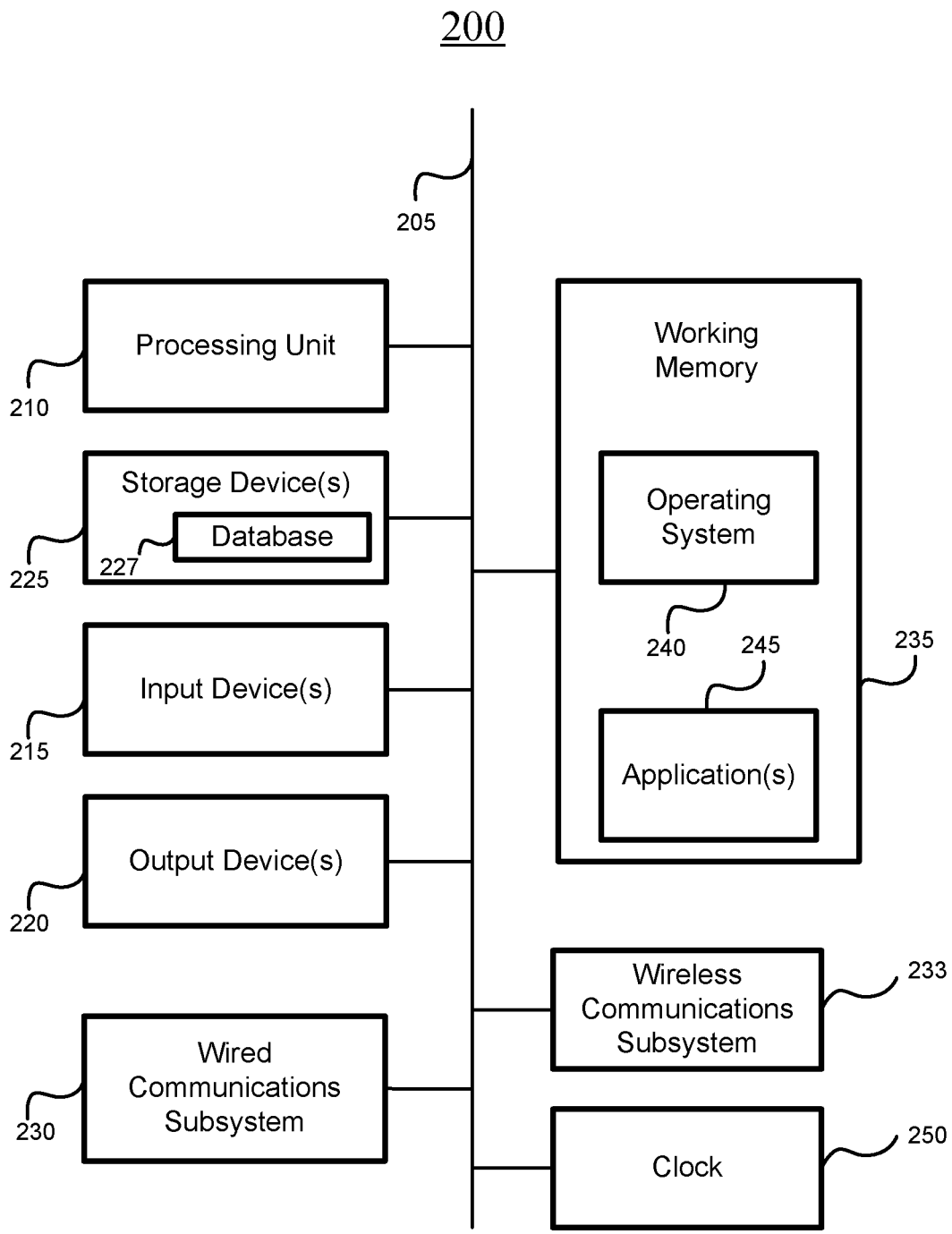
FIG. 2 is an example block diagram that discloses an example computing device.

FIG. 2 illustrates components of an example computing system 200 for implementing some of the examples described herein. For example, components of computing system 200 can be used with FIG. 3A, 3B and so forth. It should be noted that FIG. 2 is meant only to provide a generalized illustration of various components, any or all of which may be utilized as appropriate. Moreover, system elements may be implemented in a relatively separated or relatively more integrated manner.

Computing system 200 is shown comprising hardware elements that can be electrically coupled via a bus 205 (or may otherwise be in communication, as appropriate). The hardware elements may include a processing unit 210, one or more input devices 215, and one or more output devices 220. Input device(s) 215 can include without limitation camera(s), a touchscreen, a touch pad, microphone(s), a keyboard, a mouse, button(s), dial(s), switch(es), and/or the like. Output devices 220 may include without limitation a display device, a printer, light emitting diodes (LEDs), speakers, and/or the like.

Processing unit 210 may include without limitation one or more general-purpose processors, one or more special-purpose processors (such as digital signal processing (DSP) chips, graphics acceleration processors, application specific integrated circuits (ASICs), and/or the like), and/or other processing structures or means, which can be configured to perform one or more of the methods described herein.

Computing system 200 can also include a wired communications subsystem 230 and a wireless communication subsystem 233. Wired communications subsystem 230 and wireless communications subsystem 233 can include, without limitation, a modem, a network interface (wireless, wired, both, or other combination thereof), an infrared communication device, a wireless communication device, and/or a chipset (such as a Bluetooth™ device, an Institute of Electrical and Electronics Engineers (IEEE) 802.11 device (e.g., a device utilizing one or more of the IEEE 802.11 standards described herein), a WiFi device, a WiMax device, cellular communication facilities, etc.), and/or the like. Subcomponents of the network interface may vary, depending on the type of computing system 200. Wired communications subsystem 230 and wireless communications subsystem 233 may include one or more input and/or output communication interfaces to permit data to be exchanged with a data network, wireless access points, other computer systems, and/or any other devices described herein.

Depending on desired functionality, wireless communication subsystem 233 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN and/or WPAN.

Computer system 200 of FIG. 2 may include a clock 250 on bus 205, which can generate a signal to synchronize the various components on bus 205. Clock 250 may include an LC oscillator, a crystal oscillator, a ring oscillator, a digital clock generator such as a clock divider or clock multiplexer, a phase locked loop, or other clock generator. The clock may be synchronized (or substantially synchronized) with corresponding clocks on other devices while performing the techniques described herein.

Computing system 200 may further include (and/or be in communication with) one or more non-transitory storage devices 225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like. For instance, storage device(s) 225 may include a database 227 (or other data structure) configured to store detected signals as described in embodiments herein.

In many embodiments, computing system 200 may further comprise a working memory 235, which can include a RAM or ROM device, as described above. Software elements, shown as being currently located within working memory 235, can include an operating system 240, device drivers, executable libraries, and/or other code, such as one or more application programs 245, which may comprise software programs provided by various embodiments, and/ or may be designed to implement methods, and/or configure systems, provided by other embodiments, as described herein, such as some or all of the methods described herein. Merely by way of example, one or more procedures described with respect to the method discussed above might be implemented as code and/or instructions executable by a computer (and/or a processor within a computer). In an aspect, such code and/or instructions can be used to configure and/or adapt a general purpose computer (or other device) to perform one or more operations in accordance with the described methods.

A set of these instructions and/or code might be stored on a non-transitory computer-readable storage medium, such as non-transitory storage device(s) 225 described above. In some cases, the storage medium might be incorporated within a computer system, such as computing system 200. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by computing system 200 and/or might take the form of source and/or installable code, which, upon compilation and/or installation on computing system 200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally, or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 3B:
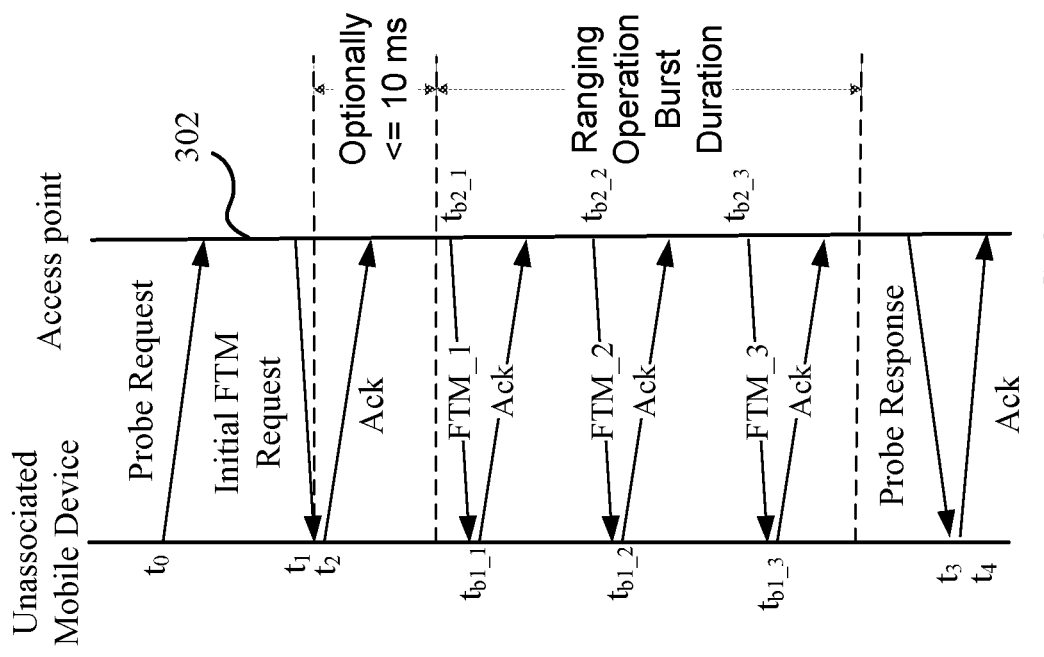
FIG. 3B illustrates ranging communications between an unassociated client device and access point, according to certain aspects of the disclosure.
Figure 3A:
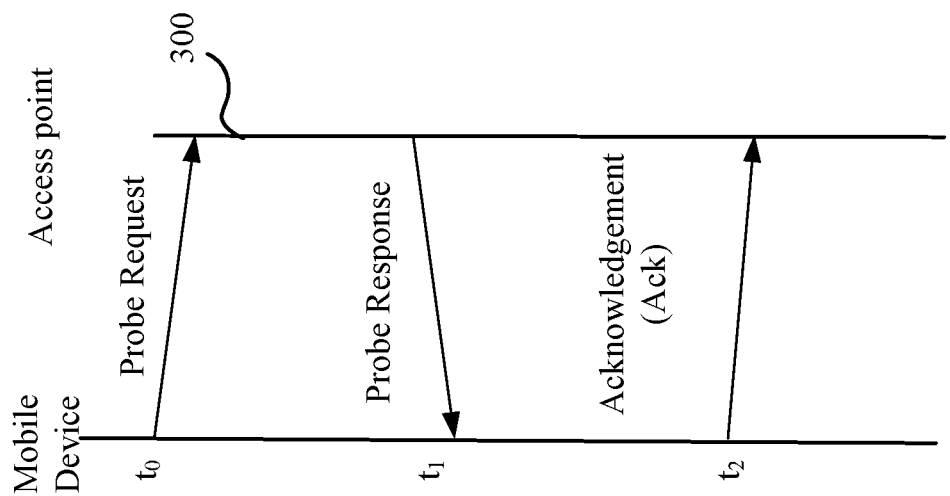
FIG. 3A illustrates communication to initiate association between a client device and access point, according to certain aspects of the disclosure.

As discussed herein and in particular in FIG. 3A and FIG. 3B, the client device (or client) referred to may be similar to the computing system of FIG. 2 and use several components disclosed in FIG. 2. In certain embodiments, the client may be a mobile device, such as a smart phone. Furthermore, the access point disclosed herein and in particular in FIGS. 3A and 3B may be similar to the mobile device 102, base transceiver stations 106, or wireless signal emitting devices 108 of FIG. 1 and may also have similar components to the components disclosed with reference to FIG. 2.

In an example embodiment WLAN infrastructure, client devices can scan and connect to access points (AP). The WLAN scans allow discoverability of access points and enable the client devices to learn identities and capabilities of access points. During WLAN scans, client devices can receive WLAN beacon frames from the APs, or receive probe response frames as a response to a respective probe request frame that the client transmits (as detailed in IEEE 802.11 REVmc D6.0 § 11.1.4.3).

Once the client device receives the probe response, or the beacon frame, the client device can then initiate the WLAN association procedures, during which the client and access point exchange association request and response frames. Any of these frames (beacons, probe requests/response, association request/response) can contain an informational element called an extended capabilities information element, which can describe respective capabilities of the device transmitting the frame. For 802.11 capable devices, association and association procedures can be defined by IEEE 802.11 REVmc D6.0 §§ 6.3.7, 4.5.3.3, and/or 4.10.3. These capabilities can be indicative of various services that the device can offer. For example, a client device that is interested in performing ranging operations with an access point using a Fine Timing Measurement (FTM) procedure, can determine FTM response capabilities of an access point from the extended capabilities information element of a frame transmitted by the access point (or vice versa).

Client devices are able to discover access points and accordingly range with the access points if the access points are always-on/always-available on a home channel, for example. The clients can also perform range operations with an access point after establishing a connection with the access point. For example, the client device can discover that a nearby access point is an FTM capable responder. The client device can then send to the access point an FTM request frame, to which the access point can respond with a corresponding FTM frame. This ranging may be referred to as client initiated ranging.

On the other hand, access points in a network infrastructure may perform range operations with client devices. These client devices may or may not be associated with an access point. A client device may be considered associated with an access point once a connection for communicating data between the mobile device and the access point has been established. For example, in certain embodiments, a mobile device may scan for or discover available access points in the vicinity of the mobile device by broadcasting probe requests that can be received by the access points. The access points that receive the probe request may respond with a probe response to the mobile device. The mobile device may receive several such responses. In certain instances, a user (or the mobile device itself) may select one of the access points and establish a connection with that access point.

Techniques for access point initiated ranging operations with nearby client devices may include additional challenges when compared to client device initiated ranging operations. For the access point to initiate ranging operations with a client device, the access points may need to overcome several challenges, that may include: i. discovering the client devices, ii. learning the capabilities of the discovered client devices, and iii. determining the availability of a client device for exchanging ranging frames with the client device.

When a client device is associated with an access point, the access point may be able to initiate ranging operations with the client (assuming that the client device is capable of performing corresponding ranging operations). When the access point and the client device are associated, the access point may know whether the client device is available on a specific channel shared between the access point and the user device, whether the client device is awake (i.e., not in a power saving state precluding reception of ranging frames). Thus, the access point can determine if an associated client device is capable of responding to the access point's ranging operation transmissions. Additionally, if a user device is associated with an access point, then any other unassociated access point may be able to communicate with the client device, such as by spoofing the access point to which the client/user device is associated with. Hence, the challenges above can be resolved when the client device is associated with an access point in a network infrastructure when performing ranging operations.

However, the scenario where the client device is not associated with any access point of the network infrastructure presents challenges when performing ranging operations. For example, a client device's presence on an access point's home channel can be fleeting (such as during scans), making it more difficult to communicate with and track availability of unassociated client devices.

Aspects of the disclosure describe techniques for network initiated ranging with unassociated client devices. Network initiated ranging with unassociated client devices may enable generating heat maps of customers in a store, or that of people on the streets of smart cities. Furthermore, aspects of the disclosure may also allow for tracking of passengers in an airport by providing network initiated ranging for unassociated clients.

Illustrated in FIG. 3A is a timing diagram 300 for initiating ranging operations between a mobile device and an access point. As illustrated, when a mobile device scans for access points on a certain WLAN channel, the mobile device can send a probe request at time $t_0$. The mobile device can then wait for a determined amount of time, such as a few milliseconds on the channel, for one or more probe responses from access point(s) on that WLAN channel. In certain instances, access point(s) respond to the probe request with a probe response (illustrated as occurring at time $t_1$), to which the client sends an acknowledgement (ACK) frame (illustrated as occurring at time $t_2$). The behavior of mobile devices actively scanning for access points (by sending probe requests) can be similar for each of many mobile devices. During an amount of time where the client mobile is waiting for a probe response from an access point, the client device can be available on a channel of one or more unassociated access points. This amount of time can present a window of opportunity to such an unassociated access point, to be able to request or initiate timing measurements with the mobile device for performance of ranging operations.

FIG. 3B illustrates a timing diagram 302 for initiating ranging operations between an unassociated mobile device and an access point, according to certain aspects of the disclosure. In certain instances, the access point may receive a probe request from an unassociated mobile device while the mobile device is scanning for access point(s). In such instances, the access point(s) can inspect the probe request's extended capabilities informational element from a probe frame transmitted by the unassociated client device (illustrated as being initiated at time $t_0$). The access point can use information from the probe request's extended capabilities informational element to determine ranging and other capabilities of the client device. In certain embodiments, the access point can utilize other information, such as of a probe request, to determine capabilities of a mobile device.

If the mobile device is capable of performing ranging operations (e.g., is FTM responder capable), the access point can then send an initiate FTM request (iFTMR) frame to the mobile device (illustrated as being initiated at time $t_1$), instead of directly responding to the probe request with a probe response as illustrated for FIG. 3A. If the client device is an IEEE 802.11 (802.11REVmc or higher in some embodiments) standards compliant device, then the mobile device could respond to the access point with frames for performing FTM techniques as shown in FIG. 3B. Once the FTM technique is completed, as shown in FIG. 3B, the access point can respond with a probe response, to which the unassociated client device responds with an ACK.

During ranging operations, multiple fine timing measurement frames can be transmitted from an access point to a mobile device. The FTM frame can be used by access point to determine sufficiently granular timing measurements between transmissions and reception of communications between the access point and a mobile device to support ranging operations. Illustrated are several such FTM frames occurring respectively at times $t_{b2\_1}$, $t_{b2\_2}$, and $t_{b2\_3}$. Each of the FTM frames can be responded to by the mobile device with respective Ack responses illustrated as occurring respectively at times $t_{b1\_1}$, $t_{b1\_2}$, and $t_{b1\_3}$. Using known locations of access points that each determine a range to a mobile device, an accurate location estimate of the mobile device can be determined. As disclosed herein an RTT can be determined for each of the FTM frames using timestamps, a common clock, clock offsets, or other techniques.

After the probe response and acknowledgement frames, illustrated as occurring respectively at times $t_3$, and $t_4$, one or more access points can be associated with a mobile device. In certain embodiments, several access points initiate ranging operations with a mobile device, some being associated and some not. In certain embodiments, a single access point is associated with a mobile device and two unassociated mobile devices are used to determine a location of a mobile device. In certain embodiments, three unassociated access points are used to determine a position of a mobile device.

Figure 4:
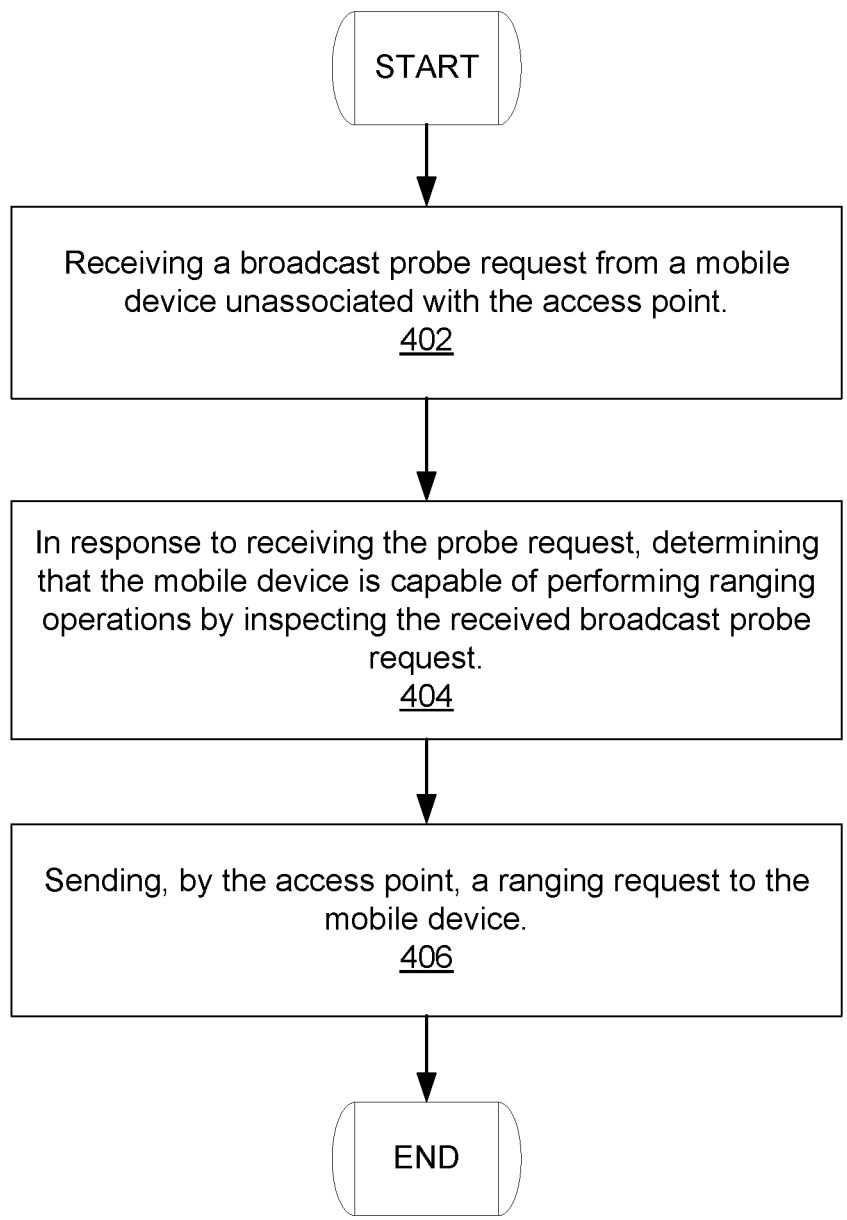
FIG. 4 illustrates a flowchart for performing techniques according to certain aspects of the disclosure.

FIG. 4 illustrates a flowchart 400 according to certain embodiments. At 402, a broadcast probe request can be received at an access point from a mobile device unassociated with the access point. This probe can be a probe initiated prior to associating the mobile device with the access point. The probe can be used by the mobile device to determine if access points are available to associate with, what channel(s) the access point(s) communicate with, capabilities of the access point(s), etc. The probe can also be used to determine if certain access points are encrypted and possibly unavailable to the mobile device for association.

At 404, in response to receiving the probe request, a determination can be made that the mobile device is capable of performing ranging operations by inspecting the received broadcast probe request. For example, informational element contents of one or more frames can be inspected to determine if the mobile device is capable of performing specific ranging operations. The specific operations can be operations that the access point is capable of performing to determine a range between the access point and the mobile device. In certain embodiments, the range information can further be used to trilaterate a position of the mobile device in relation to access points.

At 406, the access point can send a ranging request to the mobile device. The ranging request can be a request to perform a ranging operation. For example, multiple FTM or other frames can be transferred between the mobile device and the access point for ranging. Various other information can be transferred between the access point and a mobile device to determine, for example, a common timing schema between the two, a time in flight of transmissions between the two, or other information useful for determining range information.

Figure 5:
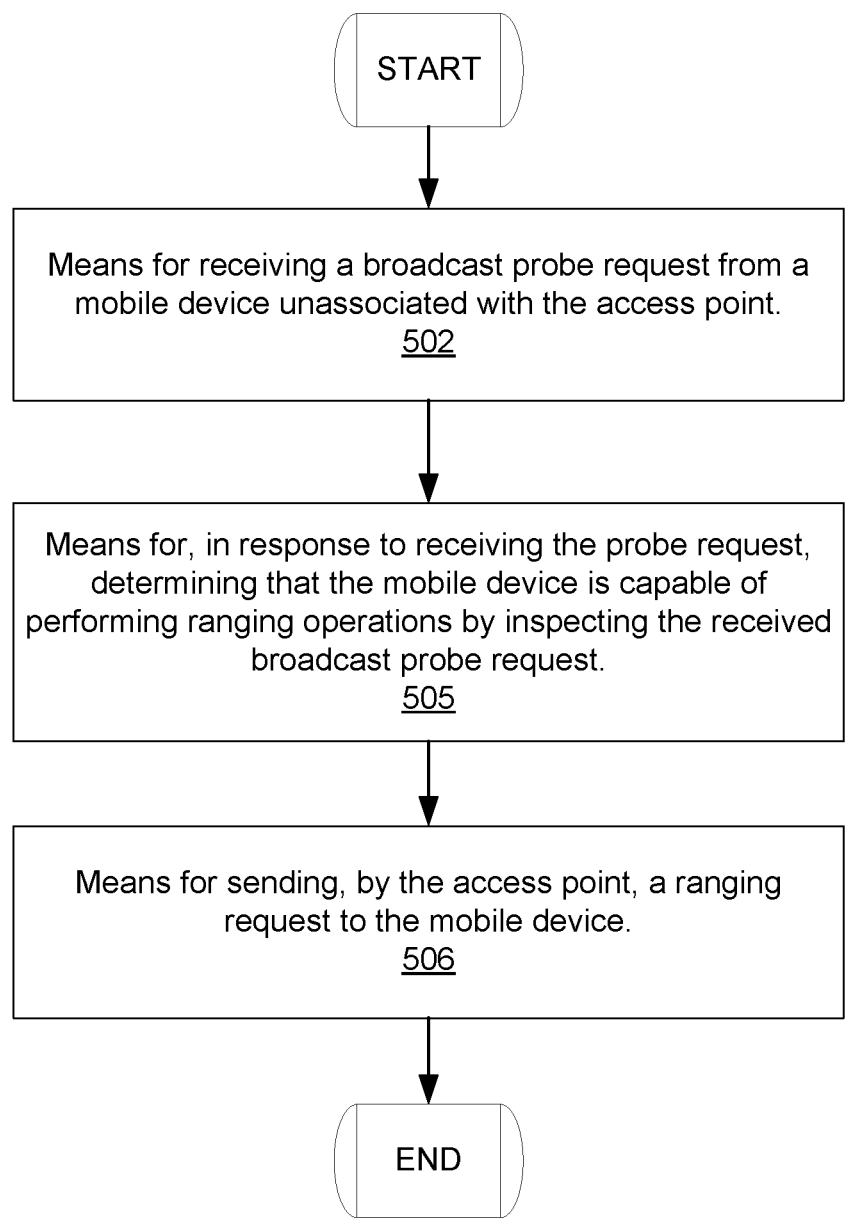
FIG. 5 illustrates a flowchart for performing techniques according to certain aspects of the disclosure.

FIG. 5 illustrates a flowchart 500 according to certain embodiments. At 502 is a means for a broadcast probe request to be received at an access point from a mobile device unassociated with the access point. Examples means include transceiver(s) (such as part of wireless communications subsystem 233 illustrated in FIG. 2), processor(s) (such as processing unit 210 illustrated in FIG. 2), and other features of an access point. This probe can be a probe initiated prior to associating the mobile device with the access point. The probe can be used by the mobile device to determine if access points are available to associate with, what channel(s) the access point(s) communicate with, capabilities of the access point(s), etc. The probe can also be used to determine if certain access points are encrypted and possibly unavailable to the mobile device for association.

At 504 is a means for, in response to receiving the probe request, determining that the mobile device is capable of performing ranging operations by inspecting the received broadcast probe request. An examples means includes processor(s) of an access point (such as processing unit 210 illustrated in FIG. 2). For example, informational element contents of one or more frames can be inspected to determine if the mobile device is capable of performing specific ranging operations. The specific operations can be operations that the access point is capable of performing to determine a range between the access point and the mobile device. In certain embodiments, the range information can further be used to trilaterate a position of the mobile device in relation to access points.

At 506 is a means for the access point can to send a ranging request to the mobile device. Examples means include transceiver(s) (such as part of wireless communications subsystem 233 illustrated in FIG. 2), processor(s) (such as processing unit 210 illustrated in FIG. 2), and other features of an access point. The ranging request can be a request to perform a ranging operation. For example, multiple FTM or other frames can be transferred between the mobile device and the access point for ranging. Various other information can be transferred between the access point and a mobile device to determine, for example, a common timing schema between the two, a time in flight of transmissions between the two, or other information useful for determining range information.

In certain embodiments, the access point may selectively respond to probe requests with ranging requests based on one or more criteria. For example, in certain implementations, the access point may initiate a ranging request in response to the probe request if a Received Signal Strength Indication (RSSI) of the probe request is above a certain threshold. In another implementation, the access point may initiate a ranging request in response to the probe request based on a first come, first served model.

In certain embodiments, access point(s) can be configured to initiate ranging operations with user device(s) that transmit probe or other frames at a threshold signal strength. For example, a threshold signal strength can indicate that certain user devices are relatively closer to the access point. In instances wherein a plurality of access points are available for performing ranging operations with unassociated device(s), only those access points which can be determine to be in relative proximity to certain user devices may be selected for ranging operations. Such techniques can reduce bandwidth and message traffic that, for example, may be unnecessary for determining a location of a user device.

In certain embodiments, a user device can transmit an identifier with frames transmitted during with ranging operations. This identifier may not absolutely identify a user device, but may enable access points to more easily trilaterate a position of the mobile device. For example, a user device may be ranged by two or more access points to trilaterate a position of the user device. If the user device is not associated with the access points, then it may be difficult to associate range information between the two or more access point with a single user device. This identifier may be configured to maintain a certain degree of anonymity of the user device. If the user device were associated with the access point, then the identity information may be more easily attainable.

In certain embodiments, capabilities or other information contained within a frame transmitted by a user device (such as within an informational element of a frame) along with signal strength or other information to aid in identification of a specific user device. For example, a user device from a certain make of user device that communicates with a first access point at a first signal strength can be inferred to be a user device communicating with a second access point at a second signal strength that has been identified to be of the same make. Signal strengths can be determined to aid in determination of a user device by, for example, determining that a user device at a certain area may communicates with an access point at a first signal strength and with a second access point at a second signal strength. Thus, ranges of signal strengths (or other attributes) can be used estimate a location or identity of a user device in relation to access points. Furthermore trends of changes of signal strengths (or other attributes) between access points can be used to aid in associating a specific device with ranging operations from two or more access points.

In certain embodiments a ranging operation can be performed within a time period designated between a probe request and a probe response. For example, IEEE 802.11 or other specifications can indicate a time period in which a probe response from an access point should be received by a user device before the user device times out or attempts retrying a probe. A ranging sequence can be performed during this time period in order to minimally impact probe operations by mobile devices and the ability of mobile device to quickly determine access point(s) to communicate with. In certain embodiments, initiation of a ranging operation (such as an initial FTM request) can fall within the designated time window between a probe request and probe response.

Generally, probe requests can be broadcasted from the client device to discover available access points and establish connections with one of the access points. Access points can be expected to respond expeditiously to the probe requests, within a predetermined period of time. Therefore, the probe request and probe response sequence between the client device and the access point is generally not meant for performing ranging operations, since not only are such operations unrelated to the discovery protocol, but they also add additional latency to the discovery protocol.

Aspects of the disclosure, opportunistically use the probe request to discover that a particular client is available for a particular period of time and also discover the capabilities of the client from the probe request itself for performing ranging operations and complete the ranging procedure with the client.

What is claimed is:

1. A method, comprising:
   receiving, at a station, a broadcast probe request from a mobile device unassociated with the station, the broadcast probe request including capability information indicating whether the mobile device is capable of performing ranging operation;
   determining whether the mobile device is capable of performing ranging operations based on the capability information in the received broadcast probe request; and
   in response to determining that the capability information indicates that the mobile device is capable of performing ranging operations, sending, by the station, a ranging request including a fine timing measurement (FTM) request to the mobile device to initiate a ranging operation.

2. The method of claim 1, wherein the mobile device, being unassociated with the station, does not have an established wireless connection channel between the mobile device and the station for reception of data frames from the station.

3. The method of claim 2, wherein the mobile device, being unassociated with the station, is configured to receive one or more management frames from the station.

4. The method of claim 1, wherein the capability information of the received broadcast probe request include an extended capabilities informational element.

5. The method of claim 1, further comprising receiving a ranging request response from the mobile device.

6. The method of claim 5, further comprising sending a probe response to the mobile device.

7. The method of claim 1, wherein the broadcast probe request and the ranging request are compliant to a WiFi standard.

8. The method of claim 1, wherein the broadcast probe request and the ranging request are IEEE 802.11 standard compliant.

9. The method of claim 1, wherein the broadcast probe request and the ranging request are IEEE 802.11REVmc standard compliant.

10. The method of claim 1, wherein the station determines that the broadcast probe request from the mobile device has a signal strength above a threshold; and
    wherein sending the ranging request to the mobile device is based on determining that the broadcast probe request from the mobile device has a signal strength above the threshold.

11. A device for determining a distance to a mobile device comprising:
    an antennae,
    a transceiver coupled to the antennae, the transceiver configured to communicate with the mobile device using the antennae; and
    processing logic coupled to the transceiver, the processing logic configured to:
      receive a broadcast probe request from the mobile device, the mobile device being unassociated with the device, the broadcast probe request including capability information indicating whether the mobile device is capable of performing ranging operation;
      in response to receiving the broadcast probe request, determining whether the mobile device is capable of performing ranging operations based on the capability information in the received broadcast probe request; and
      in response to determining that the capability information indicates that the mobile device is capable of performing ranging operations, send a ranging request including a fine timing measurement (FTM) request to the mobile device to initiate a ranging operation.

12. The device of claim 11, wherein the mobile device, being unassociated with the device, does not have an established wireless connection channel between the mobile device and the device for reception of data frames from the device.

13. The device of claim 12, wherein the mobile device, being unassociated with the device, is configured to receive one or more management frames from the device.

14. The device of claim 11, wherein the capability information of the received broadcast probe request include an extended capabilities informational element.

15. The device of claim 11, wherein the broadcast probe request and the ranging request are IEEE 802.11REVmc standard compliant.

16. The device of claim 11, wherein the device determines that the broadcast probe request from the mobile device has a signal strength above a threshold; and wherein sending the ranging request to the mobile device is based on determining that the broadcast probe request from the mobile device has a signal strength above the threshold.

17. A non-transitory computer readable medium comprising instructions that, when executed by one or more processors of a station, cause the one or more processors to:
receive a broadcast probe request from a mobile device unassociated with the station, the broadcast probe request including capability information indicating whether the mobile device is capable of performing ranging operation;
in response to receiving the broadcast probe request, determine whether the mobile device is capable of performing ranging operations based on the capability information in the received broadcast probe request; and
in response to determining that the capability information indicates that the mobile device is capable of performing ranging operations, send a ranging request including a fine timing measurement (FTM) request to the mobile device to initiate a ranging operation.

18. The non-transitory computer readable medium of claim 17, wherein the mobile device, being unassociated with the station, does not have an established wireless connection channel between the mobile device and the station for reception of data frames from the station.

19. The non-transitory computer readable medium of claim 18, wherein the mobile device, being unassociated with the station, is configured to receive one or more management frames from the station.

20. The non-transitory computer readable medium of claim 17, wherein the capability information of the received broadcast probe request include an extended capabilities informational element.

21. The non-transitory computer readable medium of claim 17, wherein the broadcast probe request and the ranging request are IEEE 802.11REVmc standard compliant.

22. An apparatus comprising:
a means for receiving, at a station, a broadcast probe request from a mobile device unassociated with the station, the broadcast probe request including capability information indicating whether the mobile device is capable of performing ranging operation;
a means for, in response to receiving the broadcast probe request, determining whether the mobile device is capable of performing ranging operations based on the capability information in the received broadcast probe request; and
a means for, in response to determining that the capability information indicates that the mobile device is capable of performing ranging operations, sending, by the station, a ranging request including a fine timing measurement (FTM) request to the mobile device to initiate a ranging operation.

23. The apparatus of claim 22, wherein the mobile device, being unassociated with the station, does not have an established wireless connection channel between the mobile device and the station for reception of data frames from the station.

24. The apparatus of claim 23, wherein the mobile device, being unassociated with the station, is configured to receive one or more management frames from the station.

25. The apparatus of claim 22, wherein the capability information of the received broadcast probe request include an extended capabilities informational element.

26. The apparatus of claim 22, wherein the broadcast probe request and the ranging request are IEEE 802.11REVmc standard compliant.

27. The method of claim 1, wherein the capability information indicate a type of ranging operation the mobile device is capable of performing.

28. The method of claim 1, wherein the ranging request is sent by the station to the mobile device to initiate the ranging operation when the mobile device is unassociated with the station.

29. The method of claim 1, wherein:
the broadcast probe request is a first broadcast probe request;
the mobile device is a first mobile device;
the capability information is first capability information;
the ranging request is a first ranging request;
the method further comprises:
receiving, at the station, a second broadcast probe request from a second mobile device unassociated with the station, the second broadcast probe request including second capability information indicating the second mobile device is not capable of performing ranging operations; and
in response to determining that the second capability information indicates that the second mobile device is not capable of performing ranging operations, determining, by the station, not to send a second ranging request to the second mobile device.

30. The method of claim 1, wherein the ranging request is transmitted based on determining that the mobile device is FTM responder capable.

31. The method of claim 1, further comprising sending multiple FTM frames to the mobile device after sending the ranging request, each FTM frame being associated with a different time.

32. The method of claim 6, wherein the probe response is sent to the mobile device after sending the ranging request.

33. The method of claim 1, wherein the station comprises an access point.

* * * * *